United States Patent [19]

Morris et al.

[11] Patent Number: 4,674,608
[45] Date of Patent: Jun. 23, 1987

[54] HYDRAULIC DAMPER

[75] Inventors: Roy Morris, Wick; Steven Dowling, Yate, both of England

[73] Assignee: Horstman Defence Systems Limited, Avon, England

[21] Appl. No.: 667,474

[22] PCT Filed: Feb. 7, 1984

[86] PCT No.: PCT/GB84/00033
§ 371 Date: Oct. 4, 1984
§ 102(e) Date: Oct. 4, 1984

[87] PCT Pub. No.: WO84/03131
PCT Pub. Date: Aug. 16, 1984

[30] Foreign Application Priority Data

Feb. 8, 1983 [GB] United Kingdom ............... 8303443

[51] Int. Cl.[4] .................... F16D 57/00; F16F 9/14; B60G 15/06
[52] U.S. Cl. .................... 188/290; 188/306; 188/307; 280/700
[58] Field of Search ............... 188/290, 293, 266, 272, 188/274, 306, 288, 321.11, 308, 307; 267/8 C; 280/705, 723, 721, 700, 695, 664

[56] References Cited

U.S. PATENT DOCUMENTS 1,426,115  8/1922  Shultz .................................. 188/288
1,521,602  1/1925  Derimon ............................ 188/307
1,920,273  8/1933  Peo .................................. 188/308 X
2,054,466  9/1936  Peo .................................. 188/306
2,314,493  3/1943  Guy .................................. 188/306
2,419,651  4/1947  Magrum ........................ 188/306 X

FOREIGN PATENT DOCUMENTS 2515986  10/1976  Fed. Rep. of Germany .
0394081  11/1908  France .
5690712  7/1981  Japan .

Primary Examiner—Andrews Kashnikov
Assistant Examiner—Robert Oberleitner
Attorney, Agent, or Firm—Birch, Stewart, Kolasch & Birch

[57] ABSTRACT

A hydraulic damper has a rotor (38) with vanes (36) sweeping through respective working chambers (56, 54) defined by a stator ring (12) with integral stator abutments (50). An orifice (64) is formed in each vane to permit flow past each vane which has reduced temperature dependence. Valves (66) in the vanes open at excessive torque. One stator abutment (50) is hollowed to enable overall dimensions of the damper to be reduced. In one embodiment the hollowed stator abutment receives a spool valve (70) enabling replenishment of the working chambers when at low pressure. In other embodiments the hollowed stator abutment accommodates the other torsion bar spring of a pair, so enabling the spring spacing to be reduced.

8 Claims, 7 Drawing Figures

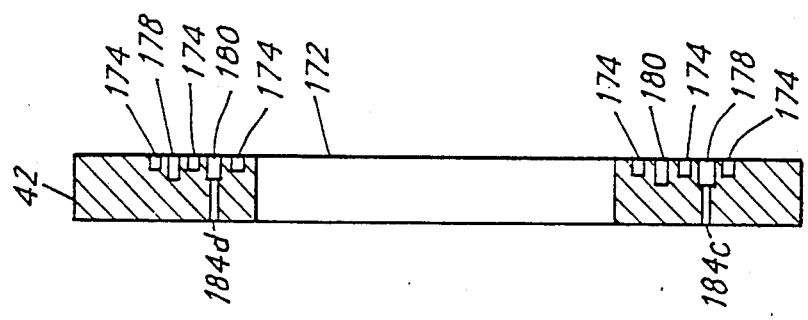
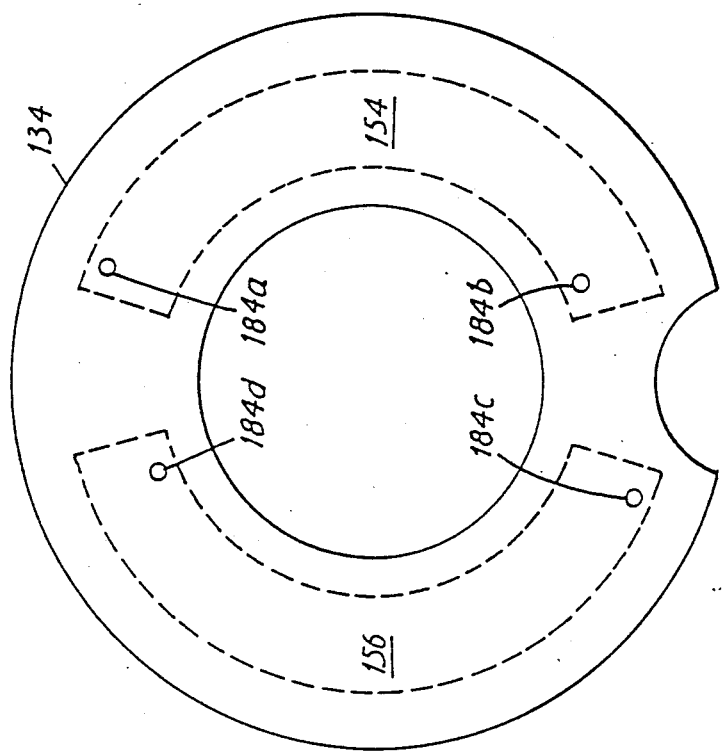

HYDRAULIC DAMPER

BACKGROUND OF THE INVENTION

1. Field of the Invention

This invention relates to hydraulic dampers for use, in one example, in suspension systems of heavy vehicles. More particularly, the invention relates to hydraulic dampers of rotary form which have the important advantages over conventional linear dampers of ruggedness and compactness.

2. Description of the Background Art

It is one problem with existing dampers that the damping characteristic varies with changes in operating conditions and in particular with changes in temperature. One object of this invention is to provide an improved hydraulic damper in which variations with temperature of the damping characteristic is much reduced.

Accordingly, the present invention consists in one aspect in a rotary hydraulic damper comprising a rotor mounted within a stator so as to define therewith at least one working chamber filled in use with hydraulic fluid; a vane for each working chamber provided on the rotor and arranged to sweep through said chamber on rotation of the rotor; and means provided in each vane to permit restricted flow of hydraulic fluid past said vane, the means comprising at least one orifice permitting turbulent flow through the vane together with valve means operating to allow increased flow when a predetermined pressure threshold is exceeded in the damper wherein each vane is provided at its radial extremity with an axially directed recess, there being located in said recess two rigid seal elements and spring means disposed between said seal elements to urge the seal elements in opposite axial directions.

The restricted flow through the orifice is capable of theoretical calculation which assists in design optimisation of the damping characteristic. Since the flow through the orifice is turbulent, it is dependent to a relatively small extent on changes in temperature so that the damping characteristic remains substantially constant over a working temperature range. The performance of the damper can therefore be close to optimum at all times.

It is generally desirable that a rotary damper should be of the smallest size consistent with the desired damping performance. This is particularly the case in the application of vehicle suspension systems where the space available on the vehicle for the damper is restricted by the design considerations of other elements of the suspension. In one particular example of a suspension system having parallel torsion bar springs extending transversely of the vehicle to support wheel arms at opposite ends, it is desirable that the radial spacing between the torsion bar springs should be minimised.

SUMMARY AND OBJECTS OF THE INVENTION

It is an object of a further form of this invention to provide an improved hydraulic damper in which overall dimensions can be reduced without detracting from the damping performance.

Accordingly, the present invention consists in a further aspect in a rotary hydraulic damper comprising a stator having two stator abutments directed radially inwardly of a generally cylindrical stator cavity; a rotor mounted coaxially within said cavity with surfaces slidably engaging said stator abutments to define two circumferentially spaced working chambers filled in use with hydraulic fluid the rotor being hollow to accommodate one torsion bar spring of a torsion bar spring pair; vanes provided on the rotor to sweep through respective working chambers on rotation of the rotor and means in each vane permitting restricted flow of hydraulic fluid past the vane, wherein one of the stator abutments is recessed partly to accommodate the other torsion bar spring of the pair.

In most applications, it is important that there should not be unbalanced forces on the rotor of a hydraulic damper. If a rotor is provided with two rotor vanes moving in separate working chambers, very careful matching of the two working chambers will be necessary to avoid unbalanced forces. It is an object of a further aspect of this invention to provide an improved hydraulic damper in which unbalanced forces on the rotor are avoided without the necessity of exact matching of working chambers and in which low pressure portions of the working chambers may be replenished with hydraulic fluid.

Accordingly, the present invention consists in a further aspect in a rotary hydraulic damper comprising a stator having two stator abutments directed radially inwardly of a generally cylindrical stator cavity; a rotor mounted coaxially within said cavity with surfaces slidably engaging said stator abutments to define two circumferentially spaced working chambers filled in use with hydraulic fluid; a pair of vanes provided on the rotor to sweep through respective working chambers on rotation of the rotor, with means in each vane permitting restricted flow of hydraulic fluid past the vane, distribution means serving to interconnect the working chambers such that—in use—hydraulic fluid pressure in advance of the rotor vanes in each working chamber is equalized and valve means connected with said distribution means and connectable with an external source of hydraulic fluid whereby low pressure portions of the respective working chambers may be replenished with hydraulic fluid, wherein said valve means comprises a spool valve having a fluid inlet for external connection to the source of hydraulic fluid, two fluid outlet ports communicating with the respective working chambers and two control ports connected with the respective working chambers, whereby in use the spool is displaced such that the fluid inlet port is connected with the working chamber of the two working chambers which is at lower fluid pressure.

Suitably, said distribution means comprises a pair of distribution passages extending generally radially through the rotor.

In another form, an end plate serving to define one axial end of the stator cavity is provided with axially directed bores communicating respectively with the working chambers and is further provided with channels which interconnect the bores but which are closed from said working chambers, whereby the working chambers are interconnected.

BRIEF DESCRIPTION OF THE DRAWINGS

The invention will now be described by way of example with reference to the accompanying drawing in which:

FIGS. 5a and 5b are respectively front and sectional views of a part of the hydraulic damper shown in FIGS. 3 and 4.

Referring to FIGS. 1 and 2, there is shown a hydraulic damper essentially comprising a circular base plate 10, a stator ring 12, a rotor 14 and a top plate 16. A series of six bolts 18 extend between the top plate 16 and the base plate 10, clamping the stator ring 12. The periphery of the stator ring 12 is formed with six semi-cylindrical recesses 20 positioned to accommodate the respective bolts. Flanges 22 are formed in the top plate 16, as shown in the detailed view of FIG. 1, to receive the bolt heads.

Figure 1:
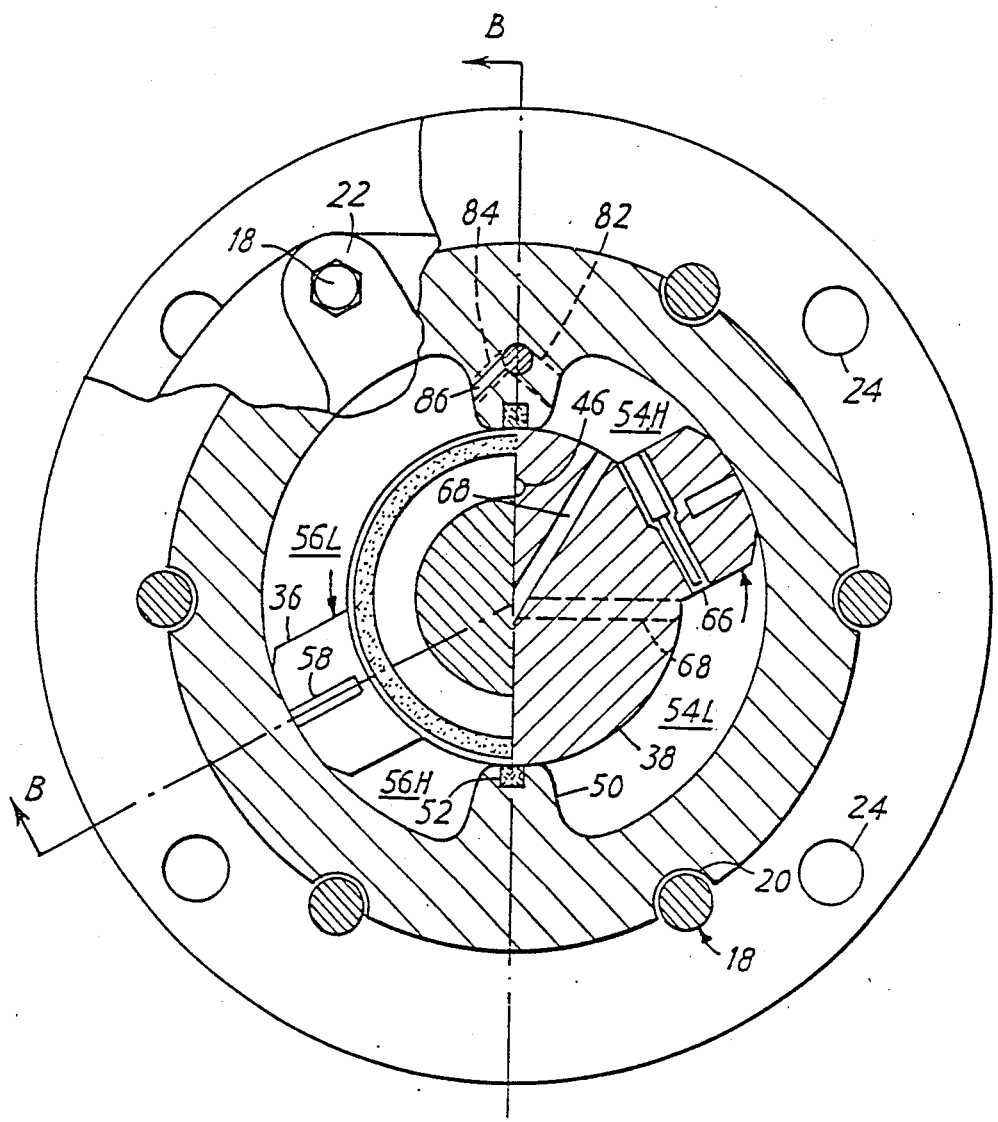
FIG. 1 is a section through a hydraulic damper according to the present invention, the plane of the section being divided as shown at AA of FIG. 2.

The base plate 10 is provided with four apertures 24 enabling the damper to be mounted in its operative position, typically on a vehicle chassis member. An upstanding bearing post 26 is formed integrally with the base plate and supports a cylindrical roller bearing 28. The surface of the base plate 10 is undercut around the bearing post to form an annular groove 30. As will be described more fully hereinafter, a passageway 32 extends from this annular groove 30 to a fluid inlet port 34 which is arranged—on mounting of the damper—to mate with a fluid port in the vehicle chassis member.

The rotor 14 is mounted on the roller bearing 28 and for this purpose is formed with a bearing cavity 35. As best seen in FIG. 1, the rotor includes a pair of vanes 36 extending diametrically from a generally cylindrical rotor portion 38. An integral shaft 40 extends axially from this portion 38 and is supported by roller bearing 42 located in the top plate 16. An annular groove 44 is cut in the top plate 16 beneath the roller bearing 42, there being a pair of bores 46 in the rotor communicating between this groove 44 and the roller bearing 28. Each end face of the rotor portion 38 is formed with an annular groove 47 containing a rotor end seal 49. These seals engage the top plate 16 and base plate 10 respectively. Outwardly of the top plate 16, the rotor is provided with a splined portion 48.

The stator ring 12 comprises a pair of radially inwardly directed stator abutments 50 which engage the cylindrical surface of rotor portion 38, axially extending stator tip seals 52 serving to prevent leakage past the stator abutments. It will be seen that two working chambers 54 and 56 are defined in the stator cavity. Each rotor vane 36 sweeps through the corresponding working chamber 54 on rotation, dividing the working chamber into a high pressure region in front of the vane and a low pressure region behind. With movement of the rotor in the direction of the arrow in FIG. 1, the two working chambers are divided into high pressure regions 54H and 56H and low pressure regions 54L and 56L.

Each rotor vane 36 is formed at its extremity with an axial slot 58; the base of each slot being arcuate such that the radial depth of the slot is at a minimum in the middle of the slot. A rotor tip seal is located in the slot of each vane, the tip seal comprising two seal elements 60 positioned side by side in the slot, a small compression spring 62 tending to separate the two seal elements.

In order to permit regulated flow from the high pressure to the low pressure portion of each working chamber on movement of the rotor, each rotor vane is formed with an orifice 64. To enable the flow to be increased at excessive torque levels (thus reducing the damping and avoiding damage), each vane is further provided with a series of three relief valves 66, two opening in one direction and one in the opposite direction. At fluid pressure levels beneath a predetermined threshold the relief valves remain closed and flow is permitted only through the orifice 64 in each vane. Since the orifices are of regular cylindrical form, the flow through them can be determined theoretically and is—as turbulent flow—dependent only to a slight extent on temperature. If the torque on the rotor exceeds a predetermined threshold, those relief valves which correspond with the particular sense of rotation of the rotor will open to permit increased flow through the vanes, thus reducing the damping effect. In the application where the rotor is connected to damp movement of a wheel arm, the relief valves are preferably chosen so that the thresholds at which the valves open are different for movement of the rotor in the senses corresponding with upward and downward movement of the wheel arm respectively.

The cylindrical rotor portion 38 is provided, as best seen in FIG. 1, with crossed bores 68, one bore interconnecting the high pressure regions of the working chambers, the other the low pressure regions. Clearly, on movement of the rotor in the opposite sense to that arrowed the roles of the two crossed bores are reversed. It is ensured in this way that the pressures in the respective working chambers are equalised. If this were not the case, stringent precautions would be required to match the two working chambers to avoid unbalanced forces on the rotor.

Figure 2:
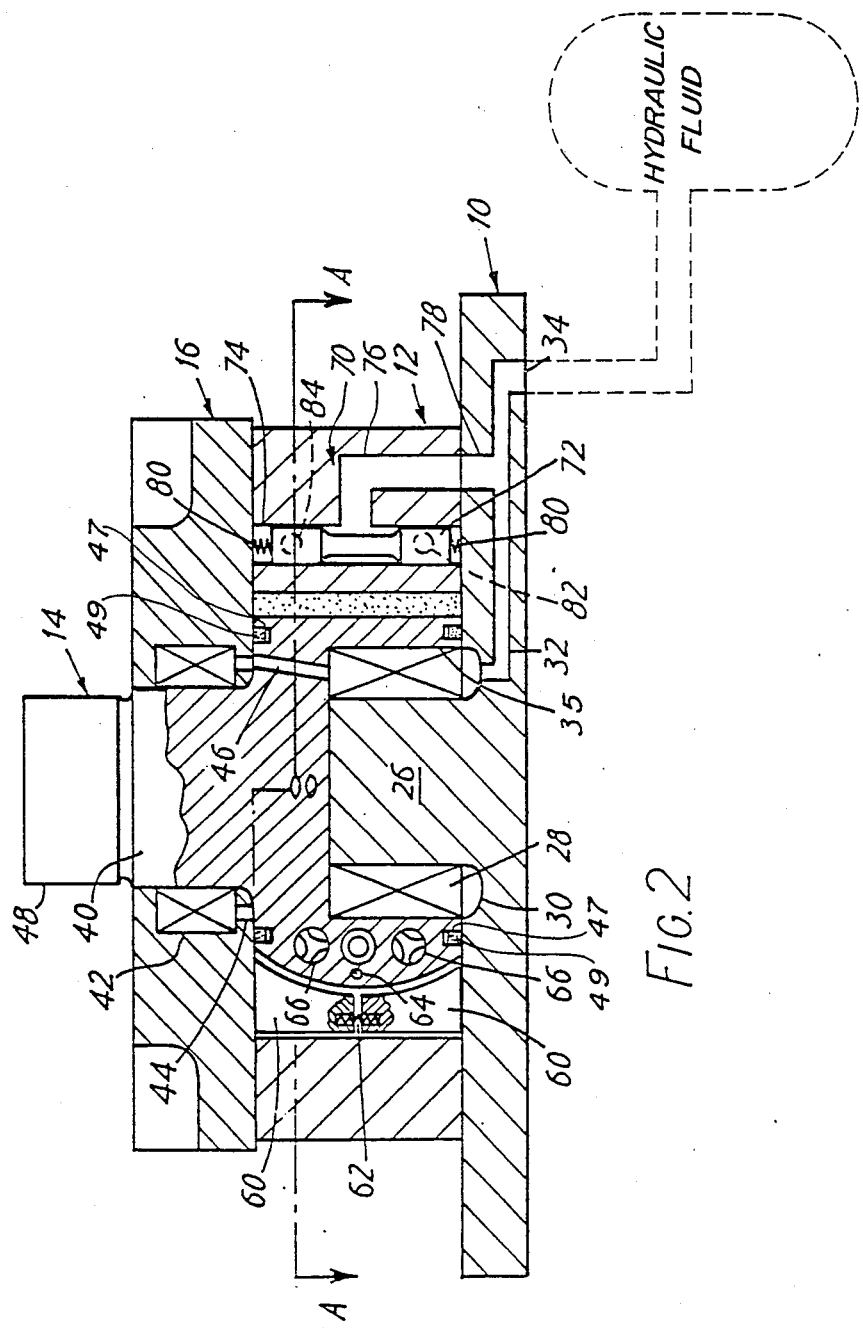
FIG. 2 is a section on the line BB of FIG. 1.

In operation of the damper, hydraulic fluid will inevitably be lost from the working chambers, despite the seals. For this reason, valve means shown generally at 70 are provided to enable replenishment of the working chambers with hydraulic fluid from the port 34. The valve means comprises a spool 72 mounted in an axial bore 74 extending through one of the stator abutments. An elbow shaped passageway 76 in the stator ring communicates between the centre of the bore 74—aligned with a central waisted portion of the spool—and a recess 78 in the base plate which in turn communicates with passageway 32. The spool 72 is biased to the rest position shown in FIG. 2 by small compression springs 80 positioned one at each end of the spool.

The stator abutment containing the spool valve is further provided with inclined bores 82, 84 communicating between the valve bore 74 and the respective working chambers. One inclined bore 82 extends in an axial plane from the lower region of the valve bore (where it is shown in dotted outline) to the working chamber 54 as shown in FIG. 1. The second inclined bore 84 extends from the upper region of the valve bore (where it is shown in dotted outline) to the working chamber 56. A shallow groove 86 is cut in the surface of the stator ring abutting the top plate 16 and is directed to communicate between the working chamber 56 and the end of the valve bore 74 adjacent the top plate. This groove is shown in FIG. 1. A similar groove (not seen in this section of FIG. 1) is cut in the surface of the stator ring abutting the base plate 10 and communicates between the working chamber 54 and the end of the valve bore 74 adjacent the base plate. It will be recognised that with movement of the rotor in the direction arrowed in FIG. 1, the high pressure in chamber portion 54H will be communicated through groove 88 to the end of the valve bore adjacent the base plate 10 causing movement of the valve spool 72 toward the top plate 16. This movement brings the waisted portion of the spool into register with the inclined bore 84 enabling replenishment of the low pressure region 56L (and through crossed bore 68) the low pressure region 54L.

The described hydraulic damper has a number of important advantages. The fact that the damping characteristic is not unduly influenced by temperature variations has been noted above. This is important not only because the damper may be required to operate under a wide range of ambient temperatures, but also because the large amounts of energy required to be dissipated in the device lead to rises in temperature. A damper according to this form of the invention is able to remain closer to the optimum damping characteristic under a range of working conditions that has previously been possible. As explained, leakages cannot totally be avoided in this form of device and it is desirable to provide for replenishment from a hydraulic fluid reservoir which may be mounted elsewhere on the vehicle or, in a modification, as part of the damper itself. It is necessary to provide a valve to ensure that fluid is not lost to the reservoir and according to a particularly advantageous feature of this invention, the valve is actually located in one of the stator abutments. As will be appreciated, this reduces the overall dimensions of the damper. A further step that has been taken to reduce overall dimensions is the formation of a bearing post on the damper base plate which extends into a cavity of the rotor so that the main rotor bearing is located inside the rotor. By this means, a significant axial shortening of the device is achieved.

A further embodiment of this invention will now be described with reference to FIGS. 3 to 6. In this form, the hydraulic damper serves to dampen the rotational movement of a torsion bar mounted wheel arm. In a particular arrangement, the torsion bar springs connected to the vehicle wheel arms extend across the width of the vehicle and it is advantageous that the hydraulic damper for one wheel arm should additionally serve as a secure mounting for the fixed end of the torsion bar corresponding with the wheel arm on the opposite side of the vehicle. An important object of the invention in this form is to minimise the radial separation between the two torsion bar springs.

Figure 3:
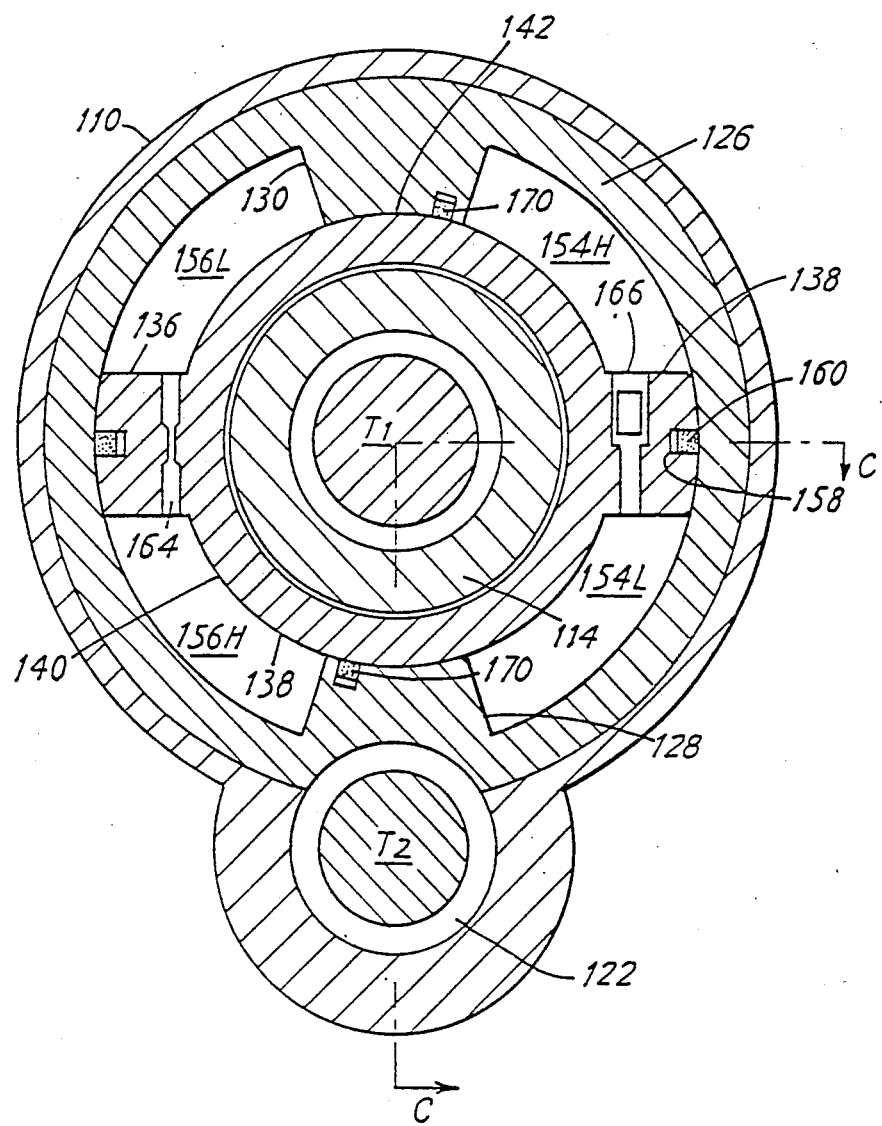
FIG. 3 is a section through a different hydraulic damper according to this invention.
Figure 4A:
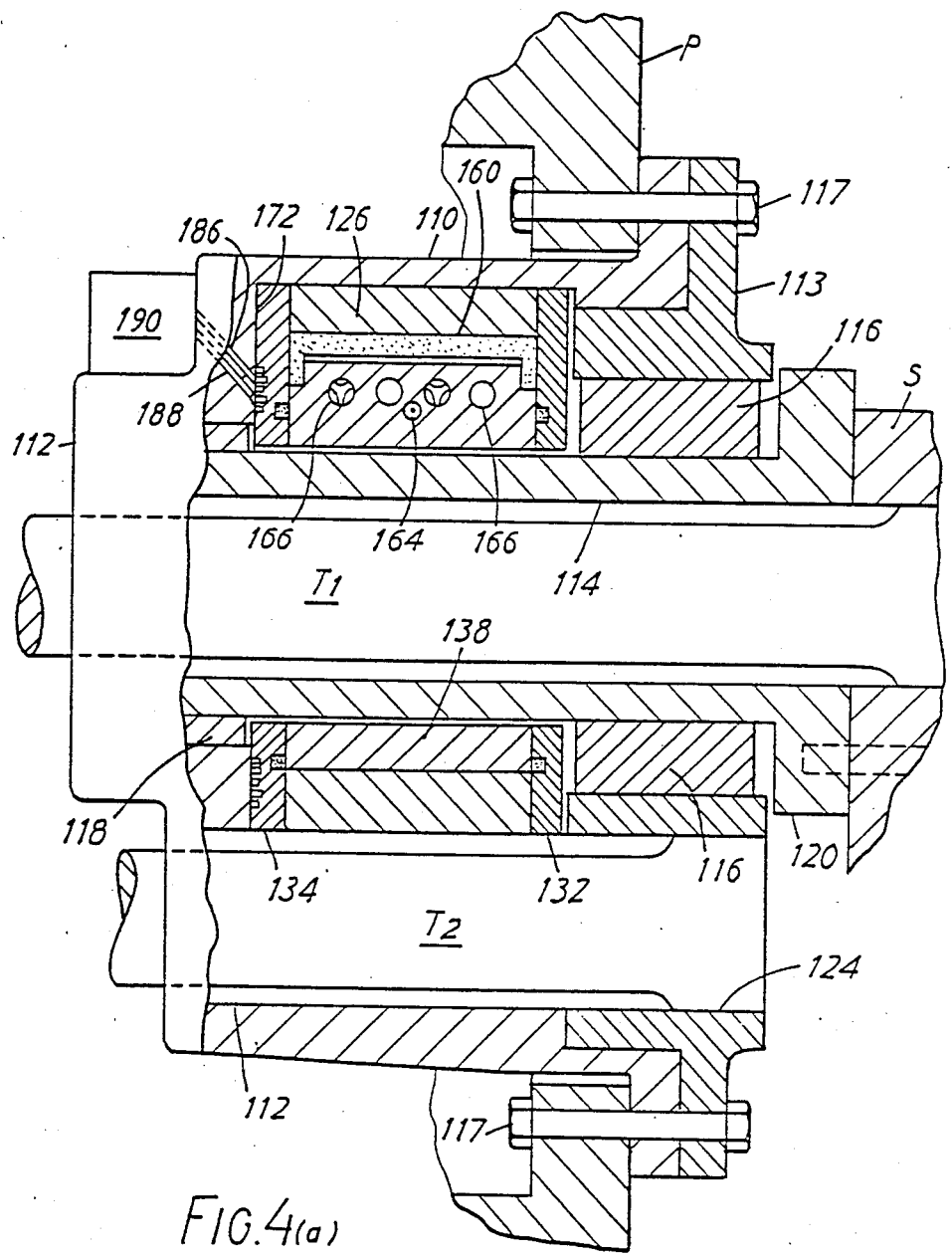
FIG. 4(a) is a section on line CC of FIG. 3.
Figure 4B:
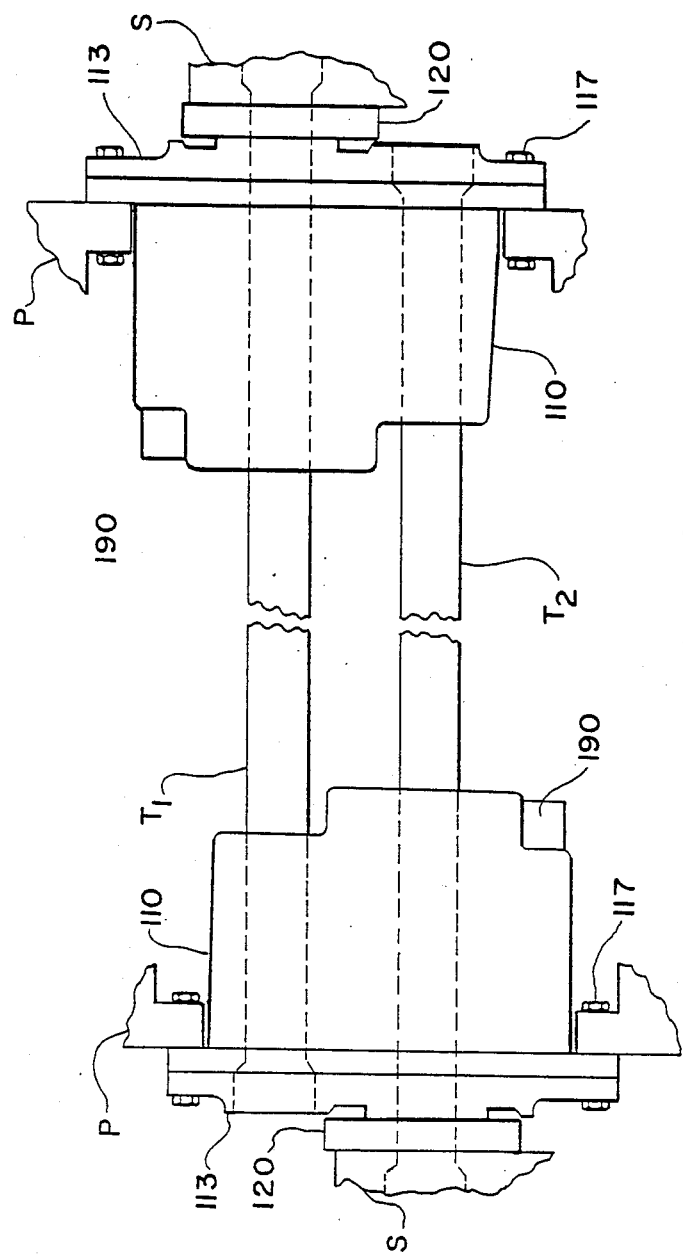
FIG. 4(b) is a partial view illustrating two rotary dampers connected by two torsion bar springs.

Referring initially to FIGS. 3 and 4(a), 4(b) the rotary damper comprises a shell-like housing 110 having a closed end and being secured at its open end to a complementarily formed front plate 113 through bolts 117 which serve additionally to mount the hydraulic damper in an aperture of a vehicle side member P. Intermediate the bolts 117 are provided shorter bolts (not seen in the drawings) which hold the parts of the damper together prior to mounting. A hollow shaft 114 is rotatably mounted by means of a bearing 116 in the front plate and a bearing 118 in the closed housing end 112. The precise details of these bearings and the accompanying seal arrangements form no part of the present invention and have been omitted from the drawings for the sake of overall clarity.

The hollow shaft 114 is formed, externally of the front plate 113, with a flange 120 to which is secured the wheel arm S. The torsion bar spring $T_1$ corresponding with this wheel arm passes freely through the hollow shaft 114 and is splined or secured in other suitable manner to the wheel arm. The fixed end of the torsion bar spring $T_2$ corresponding with the opposing wheel arm passes through an aperture 122 in the housing and is splined or otherwise secured in an aperture 124 of the front plate. It will be recognised that in the damper associated with the wheel arm on the opposite side of the vehicle, the positions of the two torsion bar springs are reversed, that is to say the end of $T_1$ is fixed and the end of $T_2$ is movable.

Within the housing 110 there is provided a stator ring 126 which, as shown best in FIG. 3, is formed with two integral stator abutments 128, 130 which extend radially inwardly. The stator cavity defined by the stator ring is closed axially by an annular end plate 132 adjacent the front plate 113 and by an annular distribution plate 134 adjacent the closed housing end 112. Suitable pins, dowels or the like are provided to ensure that the assembly of distribution plate 134, stator ring 126 and end plate 132 are fixed with respect to the housing.

In the stator cavity there is provided a rotor mounted for rotation with the hollow shaft 114. With the distinction that it is hollow, this rotor is closely similar in structure to that of the previously described embodiment. Further detailed description of the rotor is not felt necessary and it will merely be noted that parts of the rotor which are analagous with the previously described rotor bear the same reference numeral with a preceeding 1.

The distribution plate 134 is illustrated separately in FIGS. 5a and 5b. The surface 172 of the distribution plate remote from the stator cavity is formed with a series of five concentric grooves centered on the rotor axis. The inner, central and outer grooves (all referenced as 174) each carry annular seals. The remaining grooves 178 and 180 are of slightly greater depth and form flow channels. All five grooves are closed axially through the engagement of the distribution plate with the closed end housing 112; the seals serving—as will be appreciated—to prevent leakage from and between the grooves 178 and 180. Four bores 184 a, b, c and d extend through the distribution plate in the axial direction. The arrangement as shown in FIG. 5a is such that the diametrically opposed bores 184a and 184c communicate with the outer groove 178 whilst diametrically opposed bores 184b and 184d communicate with the inner groove 180. The bores are so positioned circumferentially that bores 184a and 184b communicate with opposite circumferential ends of working chamber 154, with bores 184c and 184d communicating with the ends of the chamber 156.

It will be recognised that the distribution plate serves effectively the function of the crossed bores 68 in the solid rotor of the above described embodiment. That is to say they ensure equalisation of fluid pressure in the two high pressure regions of the working chambers.

In order to permit replenishment of the working chambers with hydraulic fluid, channels 186 and 188 are formed in the closed end of the housing and communicate with a valve block 190 mounted externally of the housing.

Additional channels, not seen in FIG. 4(a), are provided to carry leakage fluid from the bearings 116, 118 to the valve block 190. The valve block is shown only diagrammatically in FIG. 4(b). It comprises a spool valve analagous in function to the spool valve of the first described embodiment and detailed description is not felt necessary.

The above described damper has a number of important advantages. As with the first described embodiment, the provision of an orifice in each vane ensures that the damping characteristic of the device is not unduly influenced by temperature variations. The preferred method of bolting the damper directly to a vehicle side wall helps to reduce temperature rises but they cannot totally be avoided. By recessing the stator abutment so that the aperture 122 extends into the cylinder of revolution of the rotor vanes the torsion bars $T_1$ and $T_2$ are brought closer together without unacceptible weakening of the stator wall between them. To this same end, the stator tip seals 170 are offset relative to the diameter which passes centrally through the stator abutments so as not to reduce the stator wall thickness in the region directly between the torsion bar.

The mentioned use of bolts not only to secure together two housing parts but also to mount the damper on the vehicle, simplifies both assembly and mounting procedures. It further enables a reduction in overall dimension of the device.

The described distribution plate enables fluid pressure to be equalised between the working chambers in a particular simple and neat manner, notwithstanding the fact that the torsion bar passes directly through the hollow rotor. By forming bores and channels in a plate serving to close one end of the stator cavity, the necessary function is performed without additional parts. Formations on the distribution plate can be machined easily and production costs are low. In other applications the described concentric grooves may be replaced by other channels interconnecting the bores 184.

It should be appreciated that the present invention has been described by way of example only and numerous variations are possible without departing from the scope of the invention. In particular, whilst the application to vehicle suspension arrangements has been described, there will be other applications where, particularly, the embodiment of FIGS. 1 and 2 will be useful. In certain applications it may be necessary to damp movement in one sense only and the modifications that require to be made in such circumstances will be apparent to the skilled reader of this specification.

We claim:

1. A rotary hydraulic damper comprising:
   a stator having two stator abutments directed radially inwardly of a generally cylindrical stator cavity;
   a rotor mounted coaxially within said cavity with surfaces slidably engaging said abutments to define two circumferentially spaced working chambers filled in use with hydraulic fluid, the rotor being hollow to accommodate one torsion bar spring of a torsion bar spring pair;
   vanes provided on the rotor to sweep through respective working chambers on rotation of the rotor and means in each vane permitting restricted flow of hydraulic fluid past the vane, wherein one of the stator abutments is recessed partly to accommodate the other torsion bar spring of the pair.

2. A damper according to claim 1, further comprising valve means, there being provided channels in said stator abutment communicating between the valve means and the respective working chambers enabling replenishment of said hydraulic fluid.

3. A damper according to claim 2, wherein said valve means comprises a spool valve having a fluid inlet port for external connection to a source of hydraulic fluid, two fluid outlet ports communicating through said bores with the respective working chambers and two control ports connected through further channels in said stator abutment with the respective working chambers whereby in use the spool is displaced such that the fluid inlet port is connected with the working chamber at lower fluid pressure.

4. A rotary hydraulic damper comprising:
   a stator having two stator abutments directed radially inwardly of a generally cylindrical stator cavity;
   a rotor mounted coaxially within said cavity with surfaces slidably engaging said stator abutments to define two circumferentially spaced working chambers filled in use with hydraulic fluid;
   a pair of vanes provided on the rotor to sweep through respective working chambers on rotation of the rotor, with means in each vane permitting restricted flow of hydraulic fluid past the vane;
   distribution means serving to interconnect the working chambers such that—in use—hydraulic fluid pressure in advance of the rotor vanes in the respective working chambers is equalized and valve means connected with said distribution means and connectable with an external source of hydraulic fluid whereby low pressure portions of the respective working chambers may be replenished with hydraulic fluid, wherein said valve means comprises a spool valve having a fluid inlet for external connection to the source of hydraulic fluid, two fluid outlet ports communicating with the respective working chambers and two control ports separate and distinct from said fluid outlet ports connected with the respective working chambers, whereby in use the spool is displaced such that the fluid inlet port is connected with the working chamber of the two working chambers which is at lower fluid pressure.

5. A suspension arrangement comprising:
   a pair of parallel torsion bar springs each adapted at a movable end thereof to support a wheel arm;
   a pair of rotary hydraulic dampers, each said damper comprising a stator having two stator abutments directed radially inwardly of a generally cylindrical stator cavity;
   a rotor mounted coaxially within said cavity with surfaces slidably engaging said stator abutments to define two circumferentially spaced working chambers filled in use with hydraulic fluid;
   vanes provided on the rotor to sweep through respective working chambers on rotation of the rotor and means in each vane permitting restricted flow of hydraulic fluid past the vane, one of the stator abutments being radially outwardly recessed;
   wherein said movable end of each torsion bar spring is secured for rotation with the rotor of the corresponding damper, the fixed end of each torsion bar spring being secured to the opposite damper and being partially accommodated within said stator abutment recess whereby the radial separation of the torsion bar springs is reduced.

6. A suspension arrangement according to claim 5, wherein each said rotor is hollow with the corresponding movable torsion bar spring end extending therethrough to support the wheel arm.

7. A rotary hydraulic damper comprising:
   a stator having two stator abutments directed radially inwardly of a generally cylindrical stator cavity;
   a rotor mounted coaxially within said cavity with surfaces slidably engaging said stator abutments to define two circumferentially spaced working chambers filled in use with hydraulic fluid;

vanes provided on the rotor to sweep through respective working chambers on rotation of the rotor;

means in each vane permitting restricted flow of hydraulic fluid past the vane and valve means having a fluid inlet port for external connection to a source of hydraulic fluid, two fluid outlet ports communicating with the respective working chambers and two control ports separate and distinct from said fluid outlet ports connected with the respective working chambers so that in use, the valve means is actuated under control of fluid pressure at said control ports such that the fluid inlet port is connected with the working chamber of the two working chambers which is at lower fluid pressure so as to enable replenishment of said low pressure working chamber with hydraulic fluid from said source of hydraulic fluid.

8. A damper according to claim 7, wherein said valve means comprises a spool valve having a spool displaceable under control of fluid pressure at said control ports.

* * * * *